US012593841B2

(12) United States Patent
Menard-Szczebara et al.

(10) Patent No.: US 12,593,841 B2
(45) Date of Patent: Apr. 7, 2026

(54) ANTIMICROBIAL MIXTURE CONTAINING 4-(3-ETHOXY-4-HYDROXYPHENYL)BUTAN-2-ONE AND AN ARGINATE COMPOUND, AND COSMETIC COMPOSITION CONTAINING SAME

(71) Applicant: L'OREAL, Paris (FR)

(72) Inventors: Florence Menard-Szczebara, Chevilly Larue (FR); Sylvie Cupferman, Chevilly Larue (FR)

(73) Assignee: L'OREAL, Paris (FR)

( * ) Notice: Subject to any disclaimer, the term of this patent is extended or adjusted under 35 U.S.C. 154(b) by 235 days.

(21) Appl. No.: 16/624,348

(22) PCT Filed: Jun. 27, 2018

(86) PCT No.: PCT/EP2018/067305

§ 371 (c)(1),
(2) Date: Dec. 19, 2019

(87) PCT Pub. No.: WO2019/002397

PCT Pub. Date: Jan. 3, 2019

(65) Prior Publication Data

US 2021/0169076 A1 Jun. 10, 2021

(30) Foreign Application Priority Data

Jun. 30, 2017 (FR) .................................... 1756175

(51) Int. Cl.
*A01N 35/02* (2006.01)
*A01N 47/44* (2006.01)

(52) U.S. Cl.
CPC ............. *A01N 35/02* (2013.01); *A01N 47/44* (2013.01)

(58) Field of Classification Search
None
See application file for complete search history.

(56) References Cited

U.S. PATENT DOCUMENTS

2009/0023790 A1* 1/2009 Levy .................... A01N 43/80 514/373
2012/0251460 A1* 10/2012 Dalko .................. A61Q 19/00 424/43
2017/0096381 A1 4/2017 Dalko

FOREIGN PATENT DOCUMENTS

EP 2016827 A2 1/2009
WO WO 2011/039445 A1 4/2011

* cited by examiner

*Primary Examiner* — Robert A Wax
*Assistant Examiner* — John W Lippert, III
(74) *Attorney, Agent, or Firm* — POLSINELLI PC

(57) ABSTRACT

The invention relates to an antimicrobial mixture containing 4-(3-ethoxy-4-hydroxy-phenyl)butan-2-one and ethyl N-lauroyl arginate hydrochloride, and also to a cosmetic composition containing such a mixture. Use in caring for, making up and cleansing keratin materials.

11 Claims, No Drawings

ANTIMICROBIAL MIXTURE CONTAINING 4-(3-ETHOXY-4-HYDROXYPHENYL)BUTAN-2-ONE AND AN ARGINATE COMPOUND, AND COSMETIC COMPOSITION CONTAINING SAME

CROSS REFERENCE TO RELATED APPLICATIONS

This application is a National Phase filing under 35 U.S.C. § 371 of PCT/EP2018/067305 filed on 27 Jun. 2018; which application in turn claims priority to Application No. 1756175 filed in France on 30 Jun. 2017. The entire contents of each application are hereby incorporated by reference.

The present invention relates to an antibacterial mixture containing 4-(3-ethoxy-4-hydroxyphenyl)butan -2-one and ethyl N-lauroyl arginate hydrochloride, and also to a cosmetic composition containing such a mixture.

4-(3-Ethoxy-4-hydroxyphenyl)butan-2-one (ketone compound) is a useful substance as a preserving agent for cosmetic compositions, for protecting the compositions against microbial contamination, as described in patent application WO 2011/039445.

However, it is desirable to be able to incorporate said ketone compound in reduced concentration in compositions, especially cosmetic or dermatological compositions, while at the same time maintaining good antimicrobial conservation performance. Combinations of the ketone compound with other compounds that have antimicrobial efficacy are thus sought for this purpose.

The inventors have discovered, unexpectedly, that the combination of 4-(3-ethoxy-4-hydroxyphenyl)butan -2-one and ethyl N-lauroyl arginate hydrochloride makes it possible to obtain an antimicrobial mixture with synergistic antimicrobial activity, in particular on yeasts, especially on *Candida albicans*, on gram-negative bacteria, especially on *Pseudomonas aeruginosa*, and on gram-positive bacteria, especially on *Staphylococcus aureus*. The results of Example 1 described below show the synergistic antimicrobial activity obtained with the minimum inhibitory concentration (MIC) measurements taken with several mixtures. The antimicrobial activity is considered as being synergistic when the antimicrobial mixture makes it possible to obtain a percentage of strain growth of less than or equal to 20%.

More precisely, a subject of the invention is an antimicrobial mixture comprising, or constituted by (or consisting of), 4-(3-ethoxy-4-hydroxyphenyl)butan-2-one and ethyl N-lauroyl arginate hydrochloride.

A subject of the invention is also a composition, especially a cosmetic or dermatological composition, comprising, in a physiologically acceptable medium, said mixture described previously.

A further subject of the invention is a process for the non-therapeutic cosmetic treatment of keratin materials, comprising the application to the keratin materials of a composition as described previously. The process may be a cosmetic process for caring for or making up or cleansing keratin materials.

4-(3-Ethoxy-4-hydroxyphenyl)butan-2-one is a compound of formula:

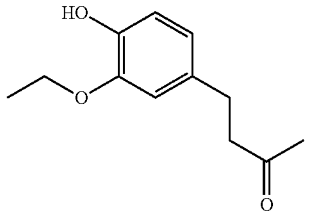

Ethyl N-lauroyl arginate hydrochloride (referred to hereinbelow as the arginate compound) (CAS No. 60372-77-2) corresponds to the following chemical structure:

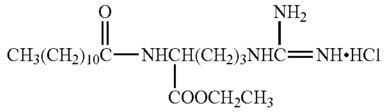

and has the INCI name: Ethyl lauroyl arginate HCl.

Advantageously, 4-(3-ethoxy-4-hydroxyphenyl)butan-2-one and the arginate compound are present in said mixture in a content such that the 4-(3-ethoxy-4-hydroxyphenyl) butan-2-one/arginate compound weight ratio ranges from 5 to 1300, preferably from 7 to 1200 and preferentially from 8 to 1100.

The antimicrobial mixture may have a 4-(3-ethoxy-4-hydroxyphenyl)butan-2-one/arginate compound weight ratio ranging from 300 to 1300, preferably ranging from 400 to 1200 and preferentially ranging from 450 to 1100. Such a mixture has good antimicrobial activity on the gram-positive bacterium *Staphylococcus aureus*.

The antimicrobial mixture may have a 4-(3-ethoxy-4-hydroxyphenyl)butan-2-one/arginate compound weight ratio ranging from 5 to 60, preferably ranging from 7 to 50 and preferentially ranging from 8 to 45. Such a mixture has good antimicrobial activity on yeasts, especially on *Candida albicans*.

The antimicrobial mixture may have a 4-(3-ethoxy-4-hydroxyphenyl)butan-2-one/arginate compound weight ratio ranging from 30 to 500, preferably ranging from 40 to 450 and preferentially ranging from 45 to 420. Such a mixture has good antimicrobial activity on gram-negative bacteria, especially on *Pseudomonas aeruginosa*.

The compound 4-(3-ethoxy-4-hydroxyphenyl)butan-2-one may be present in the composition according to the invention at an amount ranging from 0.01% to 5% by weight relative to the total weight of the composition, preferably ranging from 0.01% to 3% by weight, preferentially ranging from 0.01% to 2.5% by weight and more preferentially ranging from 0.01% to 2% by weight.

A subject of the invention is also a composition comprising, in a physiologically acceptable medium, the antimicrobial mixture described previously.

The term "physiologically acceptable medium" means a medium that is compatible with human keratin materials such as the skin, the scalp, the hair and the nails. Said medium may comprise one or more additional ingredients other than the ketone compound and the arginate compound.

The composition may comprise at least one additional ingredient chosen from water, oils, polyols containing from 2 to 10 carbon atoms, gelling agents, surfactants, film-forming polymers, dyestuffs, fragrances, fillers, UV-screening agents, plant extracts, cosmetic and dermatological active agents, and salts.

The composition according to the invention may comprise an aqueous phase.

The composition may comprise water, which may be present at a content ranging from 5% to 90% by weight relative to the total weight of the composition, and preferably ranging from 35% to 75% by weight.

The composition may also comprise a polyol that is water-miscible at room temperature (25° C.), especially chosen from polyols especially containing from 2 to 10 carbon atoms, preferably containing from 2 to 6 carbon atoms, such as glycerol, propylene glycol, 1,3-propanediol, butylene glycol, pentylene glycol, hexylene glycol, dipropylene glycol, diethylene glycol or diglycerol. Advantageously, the composition according to the invention comprises 1,3-propanediol, especially in a content ranging from 0.1% to 20% by weight, preferably ranging from 0.1% to 10% by weight and preferentially ranging from 0.5% to 5% by weight, relative to the total weight of the composition.

The compositions according to the invention may be in the form of oil-in-water (O/W) emulsions, water-in-oil (W/O) emulsions or multiple emulsions (triple: W/O/W or O/W/O), oily solutions, oily gels, aqueous solutions, aqueous gels, solid compositions. These compositions are prepared according to the usual methods.

The compositions according to the invention may be more or less fluid and may have the appearance of a white or coloured cream, an ointment, a milk, a lotion, a serum, a paste or a foam. They may be optionally applied to the skin in aerosol form. They may also be in solid form, for example in the form of a stick or a compact powder.

The composition according to the invention may especially be in the form of:

- a makeup product, especially for making up the skin of the face, the body, the lips or the eyelashes;
- an aftershave gel or lotion; a shaving product;
- a deodorant (stick, roll-on or aerosol);
- a hair-removing cream;
- a body hygiene composition such as a shower gel or a shampoo;
- a pharmaceutical composition;
- a solid composition such as a soap or a cleansing bar;
- an aerosol composition also comprising a pressurized propellant;
- a hairsetting lotion, a hair-styling cream or gel, a dye composition, a permanent-waving composition, a lotion or a gel for combating hair loss, or a hair conditioner;
- a composition for caring for or cleansing the skin.

A subject of the invention is also a process for preparing a composition, especially a cosmetic or dermatological composition, comprising a step of mixing 4-(3-ethoxy-4-hydroxyphenyl)butan -2-one, the arginate compound and one or more additional ingredients, especially cosmetic or dermatological ingredients, such as those described previously.

The invention is illustrated in greater detail in the example that follows. The amounts of the ingredients are expressed as weight percentages.

EXAMPLE 1: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of ethyl N-lauroyl arginate hydrochloride (referred to as substance B) is performed by calculating the synergy index (or FIC index) according to the following formula:

$$\text{FIC Index}=(\text{MICa with } B/\text{MICa})+(\text{MICb with } A/\text{MICb})$$

with:

- MICa with B: minimum concentration of product A in the combination A+B which makes it possible to obtain an inhibitory effect.
- MICb with A: minimum concentration of product B in the combination A+B which makes it possible to obtain the inhibitory effect.
- MICa: minimum inhibitory concentration of product A alone.
- MICb: minimum inhibitory concentration of product B alone.

This formula was described for the first time in the article by F. C. Kull, P. C. Eisman, H. D. Sylwestrowka, and R. L. Mayer, Applied Microbiology 9:538-541, 1961.

For each compound tested alone, the MIC is considered as the first concentration which makes it possible to obtain a microbial growth percentage of less than or equal to 25%.

As regards the combinations tested, MICa with b and MICb with a are the respective concentrations of A and of B in the combinations which make it possible to obtain a microbial growth percentage of less than or equal to 25%.

Interpretation of the FIC Index

When the FIC index value is less than or equal to 1, it is considered that the combination of test compounds has a synergistic effect.

The results obtained are summarized in the following tables.

The combination of compounds A and B was tested on the following strains: *Staphylococcus aureus, Candida albicans, Pseudomonas aeruginosa.*

The microbial strain Candida albicans ATCC 10231 and a double-concentration Sabouraud broth liquid culture medium were used.

The microbial strain *Staphylococcus aureus* ATCC 6538 and a double-concentration nutrient broth liquid culture medium were used.

The microbial strain *Pseudomonas aeruginosa* ATCC 9027 and a double-concentration nutrient broth liquid culture medium were used.

A 96-well microplate at an incubation temperature of 32.5° C. is used.

The incubation time of the microplate for the three abovementioned strains is from 18 to 24 hours aerobically.

Tests

For each compound:

A=4-(3-ethoxy-4-hydroxyphenyl)butan-2-one compound

B=ethyl N-lauroyl arginate hydrochloride compound (20% solution in glycerol sold under the name Aminat-G by the company Vedesqua).

A 10% (weight/volume) stock solution was prepared by mixing 1 g of compound in 9 ml of aqueous 1‰ agar solution. Successive dilutions were made with the 1‰ agar solution.

Tests of compounds A and B alone

50 μL of each of the daughter solutions obtained containing compound A or B are added to the microplate wells. 100

μl of Sabouraud liquid nutrient broth inoculated at double concentration with the strain *Candida albicans* and 50 μl of aqueous 1‰0 agar solution are also added thereto.

Tests of compounds A and B as a mixture

50 μL of each of the daughter solutions obtained containing compound A and 50 μL of each of the daughter solutions obtained containing compound B are added to the microplate wells. 100 μl of Sabouraud liquid nutrient broth inoculated at double concentration with the strain *Candida albicans* are also added thereto.

Microbial Growth Control

A positive microbial growth control was also prepared. The positive microbial growth control corresponds to a mixture of 100 μl of aqueous 1‰ agar solution with 100 μl of Sabouraud liquid nutrient broth inoculated at double concentration with the strain *Candida albicans* in the absence of compounds A and B.

Absorbance Control of Compounds A and B Alone

An absorbance control was performed in parallel on compounds A and B alone. This control corresponds to 100 μL of double concentration sterile Sabouraud liquid nutrient broth +100 μl of double concentration compound A or B.

In the three cases (absorbance control, growth control and test), the final volume present in each of the microplate wells is 200 μL.

In the two cases (test and control), the inoculum represents the concentration of the strain *Candida albicans* present in the final volume of the wells (200 μL) and is between 2 and $6\times10^5$ cfu/ml of *Candida albicans*.

The minimum inhibitory concentration (MIC) of each compound A and B alone and in combination was determined in a known manner by means of optical density measurements at a wavelength of 620 nm.

The test as described above (tests, absorbance control and growth control) was performed again to test the combination A+B on the strains *Staphylococcus aureus* and *Pseudomonas aeruginosa*.

The following results were obtained: (contents expressed as weight percentages of active material)

*Staphylococcus aureus*

| concentrations tested (in weight %) | 0 A | 0.125 A | 0.25 A | 0.5 A |
|---|---|---|---|---|
| 0 B | | 58 | 60 | 0 |
| 0.00025 B | 71 | 0 (FIC 0.75) | −1 (FIC 1) | 1 |
| 0.0005 B | 0 | 1 | −1 | 0 |

| % MIC of A | % MIC of B | MIC of each compound as a mixture | | FIC | |
|---|---|---|---|---|---|
| alone | alone | A % | B % | Index | |
| 0.5 | 0.0005 | 0.125 | 0.00025 | 0.75 | Ratio A/B = 500 |

The results obtained show synergistic inhibitory activity for the mixtures:

i) 0.125% of A and 0.0025% of B, i.e. ratio A/B=500 ii) 0.25% of A and 0.0025% of B, i.e. ratio A/B=1000

*Candida albicans*

| concentrations tested (in weight %) | 0 A | 0.025 A | 0.05 A | 0.1 A | 0.2 A |
|---|---|---|---|---|---|
| 0 B | | 80 | 62 | 24 | 3 |
| 0.0025 B | 28 | 3 (FIC 0.63) | −6 (FIC 0.75) | −2 (FIC 1) | 31 |
| 0.005 B | 9 | 8 | −3 | 7 | −10 |

| % MIC of A | % MIC of B | MIC of each compound as a mixture | | FIC | |
|---|---|---|---|---|---|
| alone | alone | A % | B % | Index | |
| 0.2 | 0.005 | 0.025 | 0.0025 | 0.63 | Ratio A/B = 10 |

The results obtained show synergistic inhibitory activity for the mixtures:

i) 0.025% of A and 0.0025% of B, i.e. ratio A/B=10 ii) 0.05% of A and 0.0025% of B, i.e. ratio A/B=20 iii) 0.05% of A and 0.0025% of B, i.e. ratio A/B=40

*Pseudomonas aeruginosa*

| concentrations tested (in weight %) | 0 A | 0.125 A | 0.25 A | 0.5 A | 1 A | 2 A |
|---|---|---|---|---|---|---|
| 0 B | | 99 | 46 | 37 | 41 | 19 |
| 0.0025 | 37 | 0 (FIC 0.56) | 0 (FIC 0.63) | 3 (FIC 0.75) | 1 (FIC 1) | 9 |
| 0.005 | 10 | −1 | −8 | −6 | 4 | −9 |

| % MIC of A | % MIC of B | MIC of each compound as a mixture | | FIC | |
|---|---|---|---|---|---|
| alone | alone | A % | B % | Index | |
| 2 | 0.005 | 0.125 | 0.0025 | 0.56 | Ratio A/B = 50 |

The results obtained show synergistic inhibitory activity for the mixtures:

i) 0.125% of A and 0.0025% of B, i.e. ratio A/B=50 ii) 0.25% of A and 0.0025% of B, i.e. ratio A/B=100 iii) 0.5% of A and 0.0025% of B, i.e. ratio A/B=200 iv) 1% of A and 0.0025% of B, i.e. ratio A/B=400

The invention claimed is:

1. A synergistic antimicrobial mixture comprising 4-(3-ethoxy-4-hydroxyphenyl)butan-2-one and ethyl N-lauroyl arginate hydrochloride in synergistically effective amounts such that the 4-(3-ethoxy-4-hydroxyphenyl)butan-2-one/ethyl N-lauroyl arginate hydrochloride weight ratio ranges from 10 to 1000 and results in synergistic antimicrobial activity due to only the 4-(3-ethoxy-4-hydroxyphenyl)butan-2-one and ethyl N-lauroyl arginate hydrochloride; and wherein the mixture has a 4-(3-ethoxy-4-hydroxyphenyl) butan-2-one/ethyl N-lauroyl arginate hydrochloride weight ratio ranging from 500 to 1000, and has antimicrobial activity on gram-positive bacteria; or wherein the mixture has a 4-(3-ethoxy-4-hydroxyphenyl)butan-2-one/ethyl N-lauroyl arginate hydrochloride weight ratio ranging from 10 to 40, has antimicrobial activity on yeasts; or wherein the mixture has a 4-(3-ethoxy-4-hydroxyphenyl)butan-2-one/ethyl N-lauroyl arginate hydrochloride weight ratio ranging from 50 to 400 , and has antimicrobial activity on gram-negative bacteria.

2. The antimicrobial mixture according to claim 1, which has antimicrobial activity on the gram-positive bacterium *Staphylococcus aureus*.

3. The antimicrobial mixture according to claim 1, which has antimicrobial activity on yeasts.

4. The antimicrobial mixture according to claim 1, which has antimicrobial activity on gram-negative bacteria.

5. A composition comprising, in a physiologically acceptable medium, an antimicrobial mixture according to claim 1 and wherein the 4-(3-ethoxy-4-hydroxyphenyl)butan-2-one is present in a content ranging from 0.01% to 5% by weight relative to the total weight of the composition.

6. The composition according to claim 5, which comprises at least one additional ingredient chosen from water, oils, polyols containing from 2 to 10 carbon atoms, gelling agents, surfactants, film-forming polymers, dyestuffs, fragrances, fillers, UV-screening agents, plant extracts, cosmetic and dermatological active agents, and salts.

7. The composition according to claim 5 wherein the 4-(3-ethoxy-4-hydroxyphenyl)butan-2-one is present in a content ranging from 0.01% to 3% by weight relative to the total weight of the composition.

8. A method for the conservation of a composition comprising a physiologically acceptable medium which comprises including an antimicrobial mixture according to claim 1 in said composition and wherein the 4-(3-ethoxy-4-hydroxyphenyl) butan-2-one is present in a content ranging from 0.01% to 5% by weight relative to the total weight of the composition.

9. A composition comprising, in a physiologically acceptable medium, an antimicrobial mixture according to claim 2.

10. A composition comprising, in a physiologically acceptable medium, an antimicrobial mixture according to claim 3.

11. A composition comprising, in a physiologically acceptable medium, an antimicrobial mixture according to claim 4.

* * * * *